United States Patent [19]

Semasa

[11] Patent Number: 5,361,142
[45] Date of Patent: Nov. 1, 1994

[54] IMAGE PROCESSING APPARATUS AND METHOD FOR MULTI-LEVEL IMAGE SIGNAL

[75] Inventor: Takayoshi Semasa, Kamakura, Japan

[73] Assignee: Mitsubishi Denki Kabushiki Kaisha, Tokyo, Japan

[21] Appl. No.: 162,580

[22] Filed: Dec. 3, 1993

Related U.S. Application Data

[63] Continuation of Ser. No. 825,973, Jan. 27, 1992, Pat. No. 5,291,309.

[30] Foreign Application Priority Data

Jan. 30, 1991 [JP] Japan .................. 3-029636

[51] Int. Cl.⁵ ............................ H04N 1/40
[52] U.S. Cl. ....................... 358/455; 358/456
[58] Field of Search ...................... 358/455–456, 358/457–458, 298, 448; 382/50

[56] References Cited

U.S. PATENT DOCUMENTS

| | | | |
|---|---|---|---|
| 4,194,221 | 3/1980 | Stoffel | 358/283 |
| 4,547,811 | 10/1985 | Ochi et al. | 358/280 |
| 4,554,593 | 11/1985 | Fox et al. | 358/455 |
| 4,899,225 | 2/1990 | Sasuga et al. | 358/448 |
| 4,987,498 | 1/1991 | Shimazaki | 358/456 |
| 4,996,602 | 2/1991 | Ono et al. | 358/457 |

FOREIGN PATENT DOCUMENTS

| | | |
|---|---|---|
| 0272147 | of 1987 | European Pat. Off. |
| 0389811 | of 1990 | European Pat. Off. |
| 58-3374 | of 1983 | Japan |
| 1-57877 | of 1989 | Japan |
| 02-112077 | of 1990 | Japan |
| 02-115987 | of 1990 | Japan |

OTHER PUBLICATIONS

New Image Processing Method for Halftone Pictures, J. of the Inst. of Electronic Information and Communication Engineers.

New Image Processing Method for Halftone Pictures, Hisashi Ibaraki, Electronics and Communications in Japan, pp. 87–99.

J. C. Stoffel et al., "A Survey of Electronic Techiques for Pictorial Image Reproduction", IEEE, Transactions of Communications, vol. Com–29, No. 12, Dec. 1991.

Bilevel Rendition Method for Documents Including Gray–Scale and Bilevel Image, Journal of the Institute of Electronics, Information and Communication Engineers, vol. J67–BN.7, pp. 781–788, Jul. 1984.

Primary Examiner—Stephen Brinich
Attorney, Agent, or Firm—Wolf, Greenfield & Sacks

[57] ABSTRACT

An image processing apparatus for outputting an image which contains different kinds of multi-level signals for letters, figures, photographs, screened-halftone, etc. The apparatus comprises a screened-halftone pattern detecting circuit and a continuous-tone pattern detecting circuit for detecting a screened-halftone pattern and a continuous-tone pattern, respectively, by using neighboring pixels of the target pixel, counters for counting UP/DOWN in accordance with the outputs of the detecting circuits, a filter for switching the filtering coefficients of the image signal in multiple stages in accordance with the outputs of the counters and a quantizer for bi-level-quantizing the output of the filter. It is thus possible to produce an image having a good quality free from deterioration due to the rapid switching of region judgements and bi-level-quantizing methods.

47 Claims, 10 Drawing Sheets

| OUTPUT OF SCREENED-HALFTONE COUNTER 4 | OUTPUT OF CONTINUOUS-TONE COUNTER 7 | CHARACTERISTIC OF FILTER 9 | MULTIPLICATION COEFFICIENT OF MULTIPLIER 11 |
|---|---|---|---|
| 12~15 | don't care | Fig. 4(d) | 1 |
| 8~11 | don't care | Fig. 4(c) | 3/4 |
| 4~7 | don't care | Fig. 4(b) | 1/2 |
| 1~3 | don't care | Fig. 4(a) | 1/4 |
| 0 | 0 | Fig. 4(e) | 0 |
| 0 | 1~2 | Fig. 4(a) | 1/4 |
| 0 | 3~4 | Fig. 4(a) | 1/2 |
| 0 | 5~6 | Fig. 4(a) | 3/4 |
| 0 | 7 | Fig. 4(a) | 1 |

FIG. 3

| 0 | 0 | 0 |
|---|---|---|
| 0 | 1 | 0 |
| 0 | 0 | 0 |

Fig. 4 (a)

| 1/32 | 1/32 | 1/32 |
|------|------|------|
| 1/32 | 3/4  | 1/32 |
| 1/32 | 1/32 | 1/32 |

Fig. 4 (b)

| 1/16 | 1/16 | 1/16 |
|------|------|------|
| 1/16 | 1/2  | 1/16 |
| 1/16 | 1/16 | 1/16 |

Fig. 4 (c)

| 3/32 | 3/32 | 3/32 |
|------|------|------|
| 3/32 | 1/4  | 3/32 |
| 3/32 | 3/32 | 3/32 |

Fig. 4 (d)

| 0              | $-\frac{1}{2}$ | 0              |
|----------------|----------------|----------------|
| $-\frac{1}{2}$ | 3              | $-\frac{1}{2}$ |
| 0              | $-\frac{1}{2}$ | 0              |

Fig. 4 (e)

DIRECTION OF SCANNING →

| −120 | 8 | −88 | 40 |
|---|---|---|---|
| 72 | −56 | 104 | −24 |
| −72 | 56 | −104 | 24 |
| 120 | −8 | 88 | −40 |

Fig. 5

TARGET PIXEL

| OUTPUT OF SCREENED-HALFTONE COUNTER 204 | OUTPUT OF CONTINUOUS-TONE COUNTER 207 | CHARACTERISTIC OF FILTER 209 | MULTIPLICATION COEFFICIENT OF MULTIPLIER 211 | MULTIPLICATION COEFFICIENT OF MULTIPLIER 27 |
|---|---|---|---|---|
| 12~15 | don't care | Fig. 4(d) | 0 | 1 |
| 8~11 | don't care | Fig. 4(c) | 0 | 1 |
| 4~7 | don't care | Fig. 4(b) | 0 | 1 |
| 1~3 | don't care | Fig. 4(a) | 0 | 1/2 |
| 0 | 0 | Fig. 4(e) | 0 | 0 |
| 0 | 1~2 | Fig. 4(a) | 1/16 | 1/2 |
| 0 | 3~4 | Fig. 4(a) | 1/8 | 3/4 |
| 0 | 5~6 | Fig. 4(a) | 1/4 | 1 |
| 0 | 7 | Fig. 4(a) | | 1 |

FIG. 9

IMAGE PROCESSING APPARATUS AND METHOD FOR MULTI-LEVEL IMAGE SIGNAL

This application is a continuation of application Ser. No. 07/825,973, filed Jan. 27, 1992, now U.S. Pat. No. 5,291,309, issued Mar. 1, 1994.

BACKGROUND OF THE INVENTION

1. Field of the Invention

The present invention relates to an image processing apparatus for bi-level-quantizing a gradated image, which is stored in digital processing, so as to record and display the bi-level-quantized image.

2. Description of the Related Art

Various copies are processed in conventional image processing apparatuses such as scanner, copying machine and facsimile. In a binary image region such as letters, for example, an image is quantized into bi-level with a fixed threshold so as to make the outline of the image clear, while in a continuous-tone image region such as a photograph a dither threshold matrix processing is adopted in order to enhance the gradation reproducibility.

In a pseudo halftone region such as screened-halftone, it is necessary to subject the region to a dither threshold matrix processing after it is filtered through a screened-halftone which suppresses the screened-halftone components in order to prevent moires.

Many copies such as a catalog have a binary image region such as letters and a continuous-tone image region in the form of a mixture. In this case, it is necessary to distinguish each region and to subject each region to an appropriate processing before outputting it.

As such processings, Japanese Patent Laid-Open No. Sho 58-3374 discloses a method of distinguishing a binary image region from a continuous-tone image region by obtaining the maximum luminance and the minimum luminance of the pixels in a block, Japanese Patent Laid-Open No. Sho 64-57877 discloses a method of distinguishing regions in screened-halftone printing by obtaining the difference in an average luminance of the pixels in a plurality of surrounding blocks, and Japanese Patent Laid-Open No. Hei 2-112077 discloses a method of distinguishing the regions on the basis of the number of pixels which constitute the peak or the trough of the curve of a gradation change in a block.

Japanese Patent Laid-Open Nos. Sho 64-57877, Hei 2-112077 and Hei 2-115987 disclose a technique of detecting screened-halftone pattern pixels by using information on the regions surrounding the target pixel.

None of these conventional methods, however, can realize the ideal discrimination of the regions, and greatly deteriorate the picture quality on the boundary of different regions at the time of bi-level-quantizing. For example, the portion having a high resolution frequency component such as an eye and hair in a portrait is judged to be a binary image region because the difference in the maximum luminance and the minimum luminance in the decision block containing that portion becomes locally large. As a result, in the output binary image, a bi-level-quantized image portion with a fixed threshold with an intensified contrast suddenly appears in a smooth pseudo halftone image.

In screened-halftone printing, in the portion in which the luminance level greatly changes such as the portion at which a gray background changes into black hair, since the difference in the average luminance of the pixels in the blocks in the vicinity of the target pixel is large, the portion is judged to be a binary image portion. Consequently, in the output image, the black hair portion which is processed by bi-level-quantizing with a fixed threshold appears in a flat background image which is smoothed and pseudo-halftoned by the filter, thereby impairing the smoothness of the image.

SUMMARY OF THE INVENTION

Accordingly, it is an object of the present invention to eliminate the above-described problems in the related art and to provide an image processing apparatus which is capable of judging a region and switching the bi-level-quantizing method in multiple stages, thereby producing an image having a good quality free from deterioration in the output image which is based on rapid switching of processing method.

To achieve this aim, the present invention provides an image processing apparatus for inputting a multi-level image signal obtained by electrically scanning an image which contains letters, figures, photographs and screened-halftone in the form of a mixture and outputting the multi-level image signal in the form of the hi-level image signal. The image processing apparatus comprises: a screened-halftone pattern detecting circuit for detecting the screened-halftone pattern by using an image signal in a first vicinity which contains the target pixel; a screened-halftone counter for counting the screened-halftone pattern detection state on each pixel; a continuous-tone pattern detecting circuit for judging whether or not the target pixel is in the continuous-tone region by using an image signal in a second vicinity which contains the target pixel; a continuous-tone counter for counting the continuous-tone pattern detection state on each pixel; a filter for filtering the image signal of the target pixel gradually on the basis of different characteristics in accordance with either or both of the outputs of the two counters; and a means for bi-level-quantizing the output of the filter.

In an image processing apparatus according to the present invention, the filtering coefficient such as a smoothing coefficient and a coefficient of high resolution frequency intensification and a bi-level-quantizing method are gradually switched in accordance with the outputs of the two counters for counting the screened-halftone pattern detection state and the continuous-tone pattern detection state on the basis of the outputs of the screened-halftone pattern detecting circuit and the continuous-tone pattern detecting circuit which detect the screened-halftone pattern and the continuous-tone pattern, respectively, by using image signals in the vicinity of the target pixel. Accordingly, it is possible to produce a processed image having a high quality free from deterioration caused by the rapid switching of processing methods.

The above and other objects, features and advantages of the present invention will become clear from the following description of the preferred embodiments thereof, taken in conjunction with the accompanying drawings.

BRIEF DESCRIPTION OF THE DRAWINGS

FIG. 3 is an explanatory view of a method of switching a bi-level-quantizing method on the basis of a filter and a dither threshold matrix in the embodiment shown in FIG. 1;

FIG. 4(a), FIG. 4(b), FIG. 4(c), FIG. 4(d) and FIG. 4(e) show the characteristics of the filter used in the embodiment shown in FIG. 1;

FIG. 5 is an explanatory view of the dither matrix signal used in the embodiment shown in FIG. 1;

FIG. 9 is an explanatory view of a method of switching a filter and a bi-level-quantizing method on the basis of an error diffusion method in the embodiment shown in FIG. 7.

DESCRIPTION OF THE PREFERRED EMBODIMENTS

The present invention will be explained hereinunder with reference to the illustrated embodiments. It is here assumed that the image signal input to the image processing apparatus has 0 to 255 levels, namely, 256 levels in total and a white signal has a level 255 and a black signal has a level 0. A white signal is output as "1" and a black signal as "0".

Figure 1:
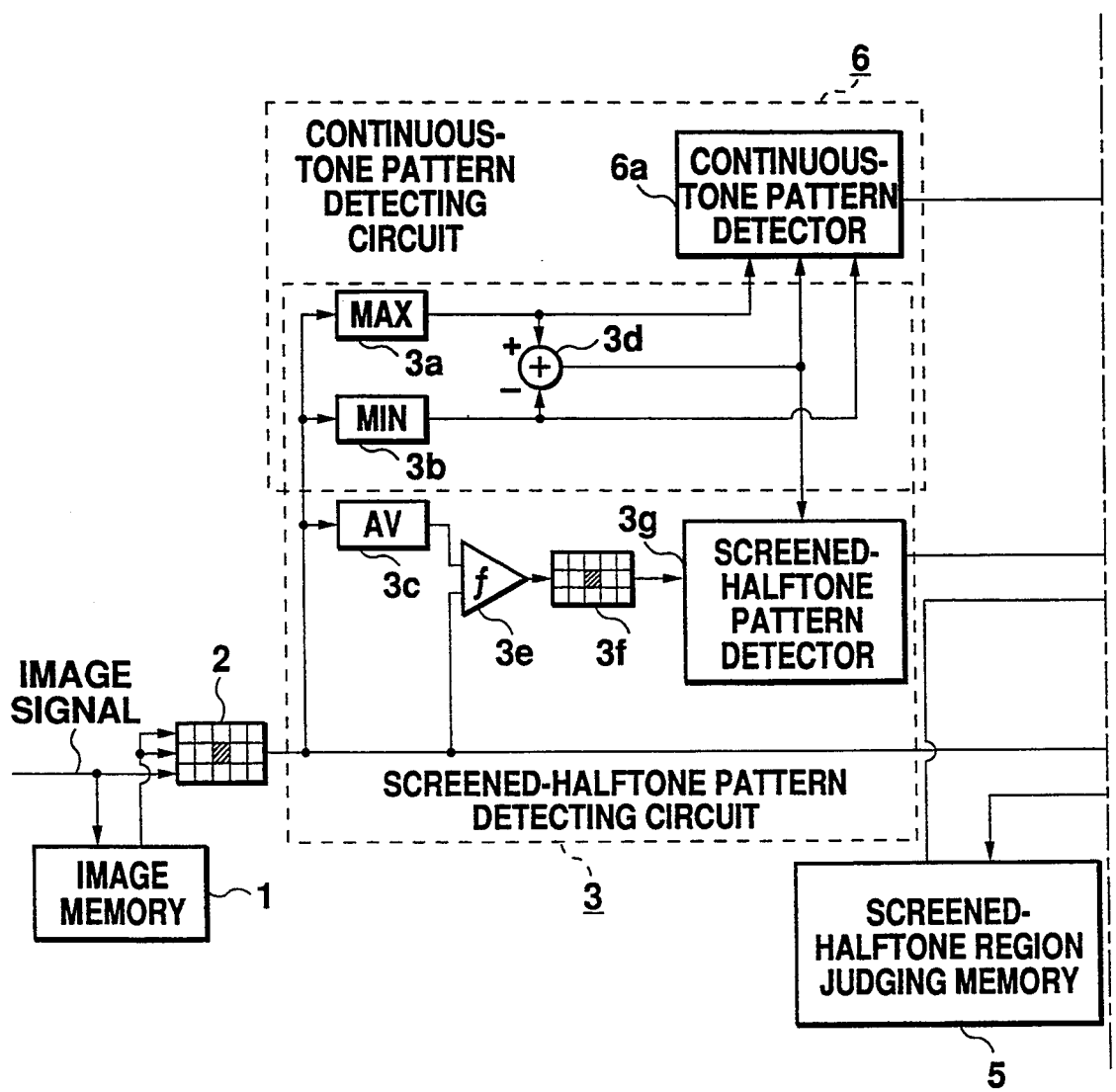
FIG. 1 is a block diagram of an embodiment of an image processing apparatus according to the present invention.
Figure 1:
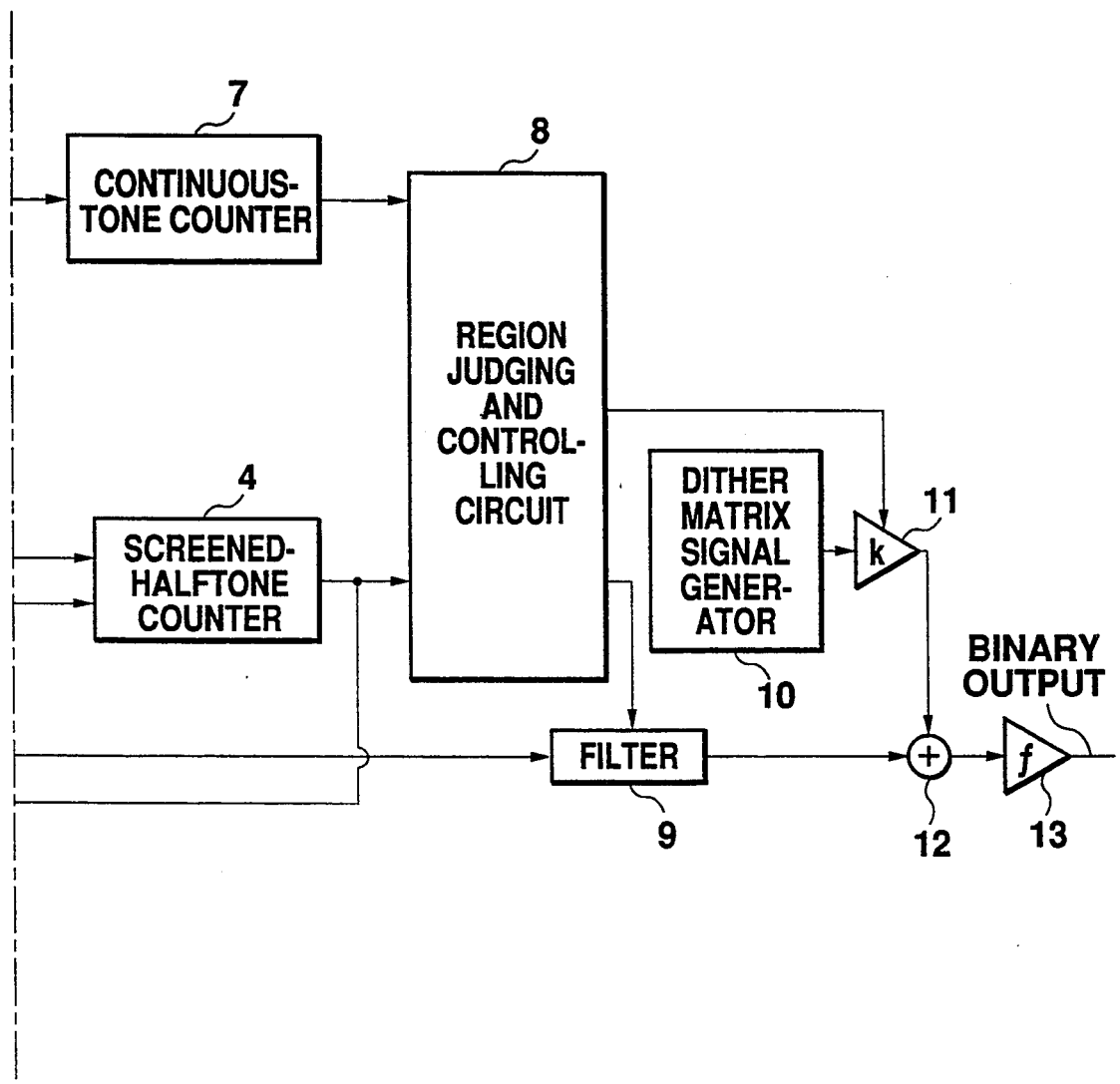

FIG. 1 shows an embodiment of the present invention. In FIG. 1, the reference numeral 1 represents an image memory for temporarily storing an input image signal, and 2 an image signal register for receiving the input image signal and the output of the image memory 1 and delaying the image signal and the output of the image memory by predetermined pixel clocks so as to make a decision image signal block of 3 lines×5 horizontal pixels in the vicinity of the target pixel. The reference numeral 3 denotes a screened-halftone pattern detecting circuit for detecting the screened-halftone pattern from the decision image signal block of the register 2, and 4 a screened-halftone counter for receiving the output of the detecting circuit 3 and the judged value judged on one line before by a screened-halftone region judging memory 5 and counting the screened-halftone detection state. The screened-halftone region judging memory 5 temporarily stores the output of the screened-halftone counter 4 until an image signal on the next line is output. The reference numeral 6 represents a continuous-tone pattern detecting circuit for detecting the continuous-tone pattern from the decision image signal block of the image signal register 2, and 7 a continuous-tone counter for receiving the output of the detecting circuit 6 and counting the continuous-tone detection state.

The reference numeral 8 represents a region judging and controlling circuit for judging in which region of the letter and figure region, the photograph (continuous-tone) region and the screened-halftone region the target pixel is on the basis of the outputs of these counters 4 and 7. The reference numeral 9 denotes a two-dimensional filter for filtering the target pixel while varying the characteristic in accordance with the signal output from the region judging and controlling circuit 8. The reference numeral 10 denotes a dither matrix signal generator for generating a dither matrix signal on the basis of the horizontal position and the vertical position of the target pixel for the purpose of pseudo halftone processing, 11 a multiplier for receiving a signal from the region judging and controlling circuit 8 and multiplying the dither matrix signal output from the dither matrix signal generator 10 by a predetermined coefficient of 1 to 0, and 12 an adder for adding the output of the multiplier 11 and the output of the filter 9. The reference numeral 13 represents a quantizer for bi-level-quantizing the output of the adder 12 on the basis of a fixed threshold value and supplying the binary output.

As shown in FIG. 1, the continuous-tone pattern detecting circuit 3 is composed of a maximum luminance detector 3a for receiving the output of the image signal register 2 and obtaining the maximum luminance in the decision block which is composed of 3 lines×5 horizontal pixels, a minimum luminance detector 3b for obtaining the minimum luminance, an average luminance detector 3c for obtaining the average luminance, a subtracter 3d for obtaining the difference between the maximum luminance output and the minimum luminance output, a comparator 3e for comparing the output of the image signal register 2 with the output of the average luminance detector 3c, a comparison result register 3f for receiving the output of the comparator 3e and temporarily storing the comparison result of 3 lines×5 horizontal pixels, and a screened-halftone pattern detector 3g for receiving the output of the subtracter 3d and the output of the comparison result register 3f and outputting the result of the detection of the screened-halftone pattern.

The continuous-tone pattern detecting circuit 6 is composed of not only the maximum luminance detector 3a, the minimum luminance detector 3b and the subtracter 3d which are also incorporated into the screened-halftone pattern detecting circuit 3, but also a continuous-tone pattern detector 6a for receiving the output signals from these detectors 3a, 3b and subtracter 3d and outputting the result of the detection of the continuous-tone pattern.

The operation of this embodiment will be explained hereinunder.

When an image signal is input, the signal on a first line is first stored in the image memory 1. When an image signal on a second line is supplied, the image signal on one line before is read out as the target line signal and the signal on two lines before (in this case, since the signal is out of the frame of the copy, it becomes a total white signal) is read out as the previous line signal, and these signals are supplied to the image signal register 2 together with the current image signal (which becomes the image signal on the next line) on the second line. At this time, the image signal on the second line is written in the image memory 1 so as to be used in the next line processing.

The image signal register 2 receives the image signals on these three lines and delays them by predetermined pixel clocks so as to generate a decision image signal block of 3 lines×5 horizontal pixels including the target pixel at the center. From this block, the screened-halftone pattern detecting circuit 3 generates a maximum luminance signal, a minimum luminance signal and a difference signal by the maximum luminance detector 3a, the minimum luminance detector 3b and the subtracter 3d, respectively. The average luminance is detected by the average luminance detector 3c and the comparator 3e compares each image signal of the 3 line×5 horizontal pixels with the average luminance and supplies the result of comparison to the comparison result register 3f. The comparison result register 3f stores the result of comparison of each pixel with the average luminance in the block of 3 lines×5 horizontal pixels including the target pixel at the center and supplies the stored result to the screened-halftone pattern detector 3g.

Figure 2:
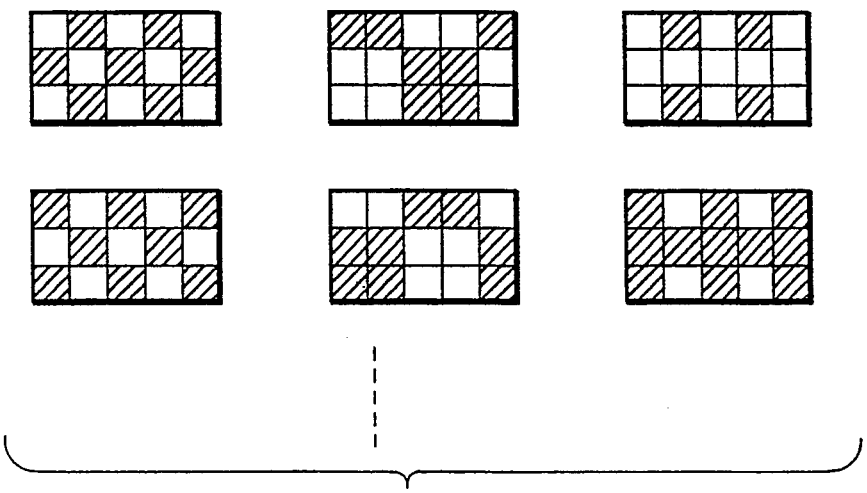
FIG. 2(a) and FIG. 2(b) are an explanatory view of an example of patterns detected by a screened-halftone pattern detector 3g in the embodiment shown in FIG. 1, wherein FIG. 2(a) includes examples of screened-halftone pattern, and FIG. 2(b) includes examples of non-screened-halftone pattern.
Figure 2:
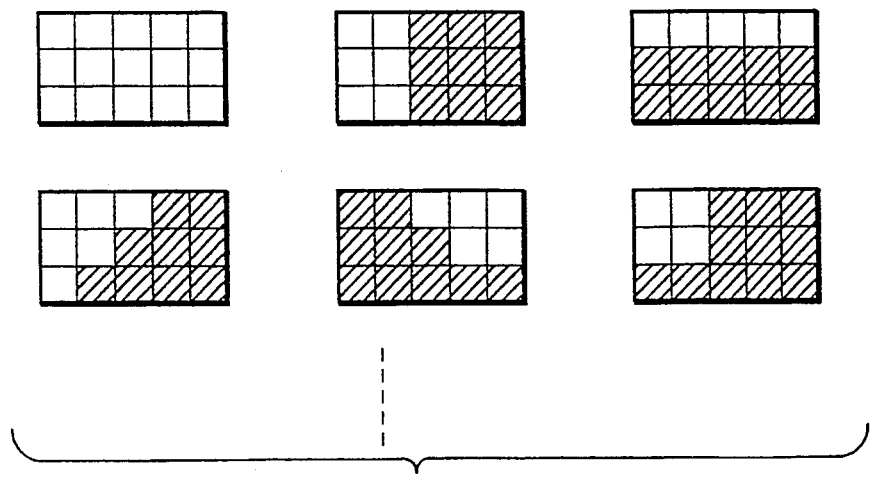

The screened-halftone pattern detector 3g detects the screened-halftone pattern by using the output of the difference between the maximum luminance and the minimum luminance of the image signal of the 3 lines×5 horizontal pixels including the target pixel at the center, namely, the output of the subtracter 3d and a preset threshold value TH1 (ordinarily about 96) under the following conditions:

when the difference signal of the subtracter $3d > TH1$ and the comparison result signal of the comparison result register 3f agrees with any of the patterns shown in FIG. 2(a), the output signal of the screened-halftone pattern detector 3g is "screened-halftone", and in the other cases, the output signal of the screened-halftone pattern detector 3g is "non-screened-halftone".

The patterns shown in FIG. 2(a) are patterns which are generated with high frequency when the target pixel is situated in the vicinity of the center of a white or black dot of each screened-halftone pattern in the case of reading screened-halftone composed of 65 to 100 lines, which are used for ordinary printed matter (screened-halftone composed of 150 lines or more are read out as a continuous-tone signal, so that the detection of them as screened-halftone is unnecessary), at a rate of 8 pixels/mm and which are scarcely generated when an ordinary letter and figure image is read out. The condition on the output signal of the subtracter 3d is designated in order to prevent a noise pattern generated when the background portion of a copy is quantized into bi-level on the basis of the average luminance from being judged to be a screened-halftone pattern by mistake. Due to this pattern detection, it is possible to detect a screened-halftone pattern in almost all the pixels in the vicinity of the center of the screened-halftone in a screened-halftone image and to greatly reduce the false detection of a screened-halftone pattern in a letter and figure image.

The screened-halftone counter 4 receives the output of the screened-halftone pattern detector 3 and the count value (in this case, since the previous line is out of the frame of the copy, the count value is 0) of the screened-halftone counter 4 which has counted about the pixels on one line before and at the same horizontal position from the screened-halftone region judging memory 5, and adds "4" to the count value when the output signal of the screened-halftone pattern detector 3g is "screened-halftone", and subtracts "1" therefrom when the output signal is "non-screened-halftone".

If the count value which has counted about the pixel at the same horizontal position of previous line from the screened-halftone region judging memory 5 exceeds the renewed count value of the target pixel, the count value of target pixel is corrected to the value substracted "1" from the count value which has counted about the pixel and at the same horizontal position of previous line. The count value is limited to 0 to 15 and even if there is a possibility of the count value exceeding this range, the count value is restricted to this range. The count value of the screened-halftone counter 4 indicates the screened-halftone pattern detection state, and if the value is large, it means that many screened-halftone patterns are detected. In other words, there is a high possibility of the target pixel being in the screened-halfton region (this state is hereinunder referred to as "a state having a high degree of screened-halftone detection").

By this procedure, the output of the screened-halftone pattern detector 3g for detecting the screened-halftone pattern which generates discretely in the screened-halftone image region is smoothed and the entire part of the screened-halftone image region assumes a state having a high degree of screened-halftone detection, while the output of the screened-halftone pattern detector 3g which detects a screened-halftone pattern in the letter and figure region by mistake is also smoothed and the letter and figure region remains a state having a low degree of screened-halftone detection.

The continuous-tone pattern detecting circuit 6 detects the continuous-tone pattern by the continuous-tone pattern detector 6a using the maximum luminance signal of the 3 lines'5 horizontal pixels, the minimum luminance signal and the difference signal output from the maximum luminance detector 3a, the minimum luminance detector 3b and the subtracter 3d, respectively, and on the basis of preset threshold values TH2 (ordinarily about 64), TH3 (ordinarily about 8) and TH4 (ordinarily about 240) under the following conditions:

when the difference signal of the subtracter $3d < TH2$, the maximum luminance $> TH3$, and the minimum luminance $< TH4$, the output signal of the continuous-tone pattern detector 6a is "continuous-tone", and in the other cases, the output signal of the continuous-tone pattern detector 6a is "non-continuous tone".

The condition on the difference signal of the subtracter 3d is designated in order to detect a continuous-tone pattern in the continuous-tone pattern region in which the signal difference in the small region is small, and the conditions on the maximum luminance and the minimum luminance is designated in order to prevent the blurred portion in the background and the letter portion from being judged to be a continuous-tone portion by mistake.

The continuous-tone counter 7 adds 2 to the count value when the detection signal of the continuous-tone pattern detector 6a is "continuous-tone", and subtracts 1 therefrom when the detection signal is "non-continuous-tone". The counted value is limited to 0 to 7 and even if there is a possibility of the count value exceeding this range, the count value is restricted to this range. The count value indicates the continuous-tone pattern detection state, and if the value is large, it means that many continuous-tone patterns are detected. In other words, there is a high possibility of the target pixel being in the halftone region (this state is hereinunder referred to as "a state having a high degree of halftone detection").

The region judging and controlling circuit 8 receives the outputs of the two counters 4, 7 and judges in which region of the letter and figure region, the photograph (continuous-tone) region and the screened-halftone region the target pixel is, and supplies a control signal to the filter 9 and the multiplier 11 in accordance with the control table shown in FIG. 3.

FIG. 4 shows the characteristics of the filter 9 in the table shown in FIG. 3. The position of the center pixel in a 3×3 matrix is assumed to be a coefficient of the target pixel and a coefficient of each of the pixels surrounding the center pixel is shown. FIG. 4(a) shows a filter which needs no correction, FIGS. 4(b) to 4(d) show low pass filters for removing a screened-halftone frequency component (a moire removing filter) and FIG. 4(e) shows a Laplacian filter for correcting the aperture effect by a sensor.

The dither matrix signal generator 10 generates a dither matrix signal shown in FIG. 5 depending upon at what position in the matrix of 4×4 pixels on the copy the target pixel is situated. That is, in FIG. 5, an image signal is divided into 4×4 pixels and the dither matrix signal corresponding to each pixel is shown. The multiplier 11 multiplies the output of the dither matrix signal generator 10 by a coefficient shown in FIG. 3 and the adder 12 adds the output of the multiplier 11 to the output of the filter 9. The quantizer 13 quantizes the output of the adder 11 into bi-level on the basis of a fixed threshold value and finally outputs the binary output as a binary output from the image processing apparatus of the present invention.

As a result, when the outputs of the counters 4 and 7 are both "0", for example, the image signal with the high resolution frequency component intensified by the filter 9 as a letter and figure image is simply quantized into bi-level with a fixed threshold by the quantizer 13. When the output of the screened-halftone counter 4 is "15" and the output of the halftone counter 7 is "0", after the screened-halftone frequency component is removed through the filter 9, a dither matrix signal is added to the output and the binary signal thus subjected to pseudo halftone processing is output. On the other hand, when the output of the screened-halftone counter 4 is "0" and the output of the continuous-tone counter 7 is "7", the output signal of the image signal register 2 is output as it is through the filter 9, and a dither matrix signal is added to the output and the binary signal thus subjected to pseudo halftone processing is output.

The above-described processing is repeated in each pixel to the end of the line. In this way, the bi-level-quantized image signal on the first line is output. Thereafter, an image signal on a third line is supplied and the image signal on the second line is processed in the same way. Similar processing is executed on each line to the end of the page.

In processing the image signal on the last line, since the image signals on all the lines have already been input to the image processing apparatus, a total white signal for a signal out of the frame of the copy is used as the data on the next line.

As described above, in this embodiment, the filtering coefficient such as a smoothing coefficient and a coefficient of high resolution frequency component intensification and the degree of superimposing a dither matrix signal are switched in multiple stages in accordance with the count values of the screened-halftone counter 4 and the continuous-tone counter 7. Since a portion having a high resolution frequency component such as an eye or the black hair in a portrait, or a portion at which a gray background changes to black hair in screened-halftone printing is subjected to continuous pseudo halftone processing by using a dither threshold matrix or pseudo halftone processing after being filtered through a moire removing filter, it is possible to produce a bi-level-quantized image having a good quality free from deterioration which is caused by a conventional apparatus due to the rapid switching of processing methods.

Figure 6:
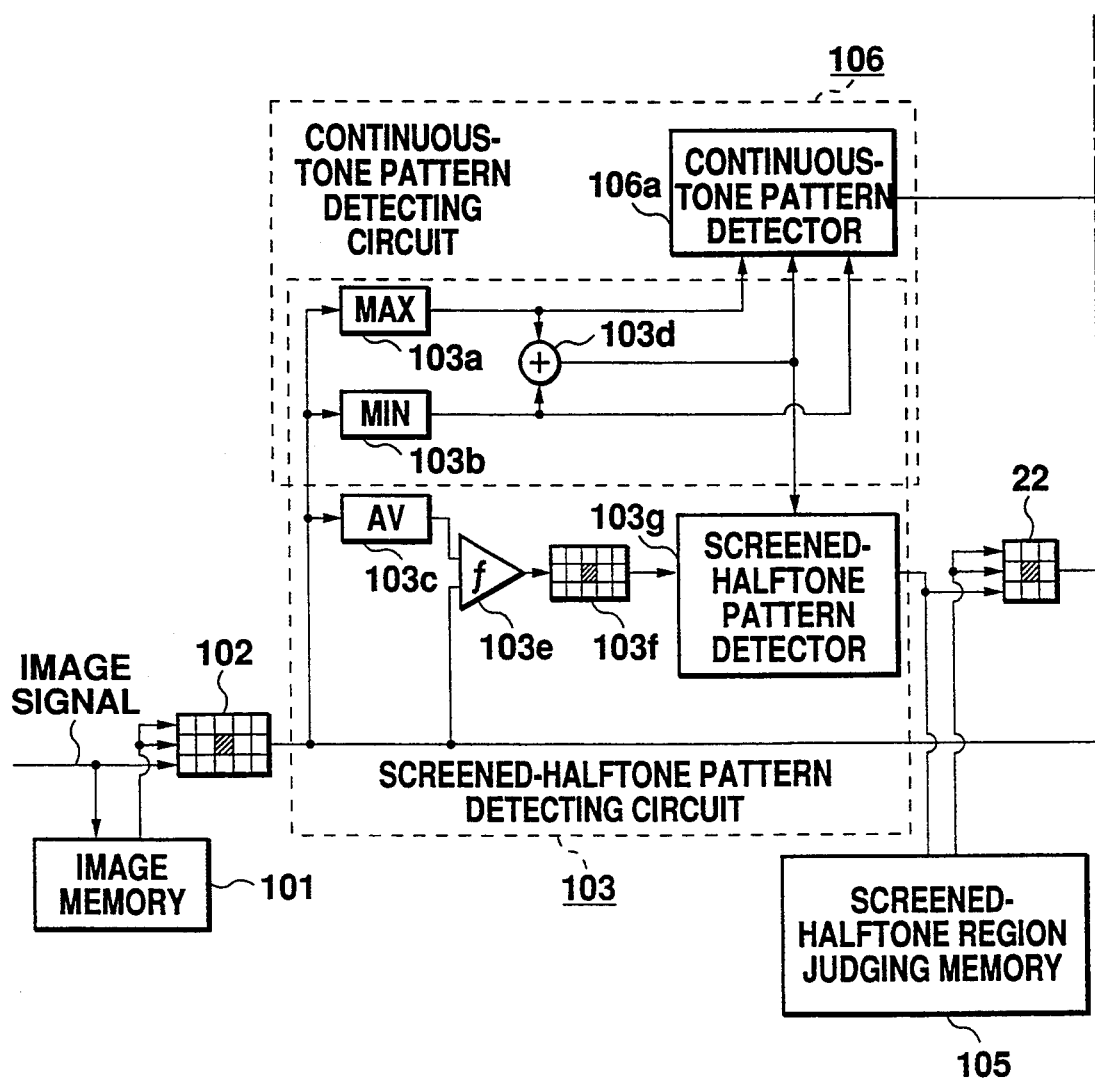
FIG. 6 is a block diagram of another embodiment of an image processing apparatus according to the present invention.
Figure 6:
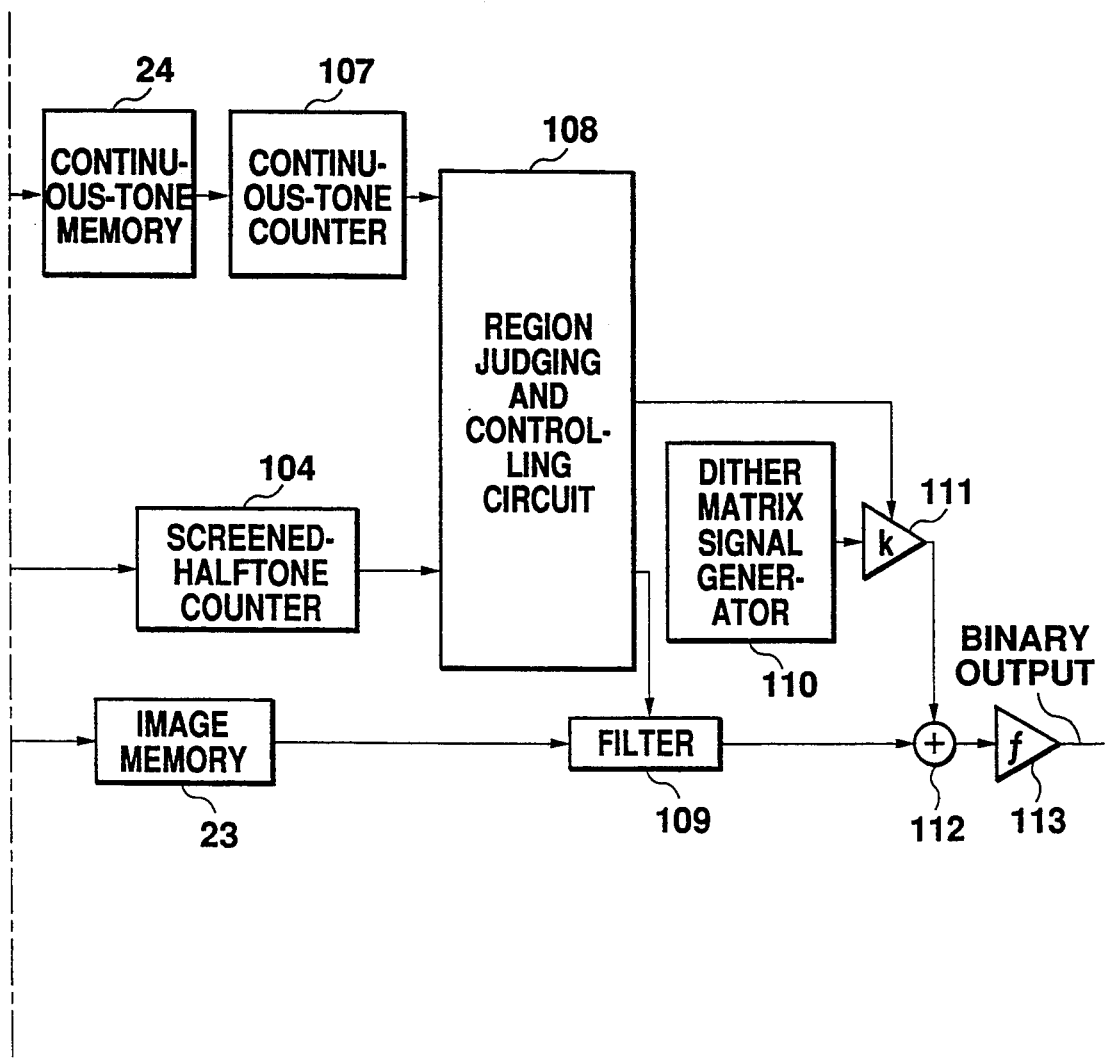

FIG. 6 shows another embodiment of the present invention. The elements which are the same as those shown in FIG. 1 are indicated by the same numerals prefixed by the numeral 1, and explanation thereof will be omitted. In this embodiment, a screened-halftone judging memory 105 stores the output of a screened-halftone pattern detector 103g in place of the output of a counter 104. The screened-halftone judging memory 105 stores the outputs of the screened-halftone pattern detector 103g for 2 lines, and a screened-halftone register 22 holds the outputs of the screened-halftone pattern detector 103g for 3 lines×3 horizontal pixels including the target pixel at the center and counts by using these outputs.

In this case, when the "screened-halftone" pixel exists in the 3 lines×3 horizontal pixels, "the number of pixels×2" is added to the count value, while no "screened-halftone" pixel exists therein, "1" is subtracted from the count value.

Since the target pixel becomes the pixel on one line after, as explained above with respect to the pixel signal register, memories 23, 24 for delaying the target pixel by one line before the respective processings by a filter 109 and a continuous-tone counter 107 are provided.

Figure 7:
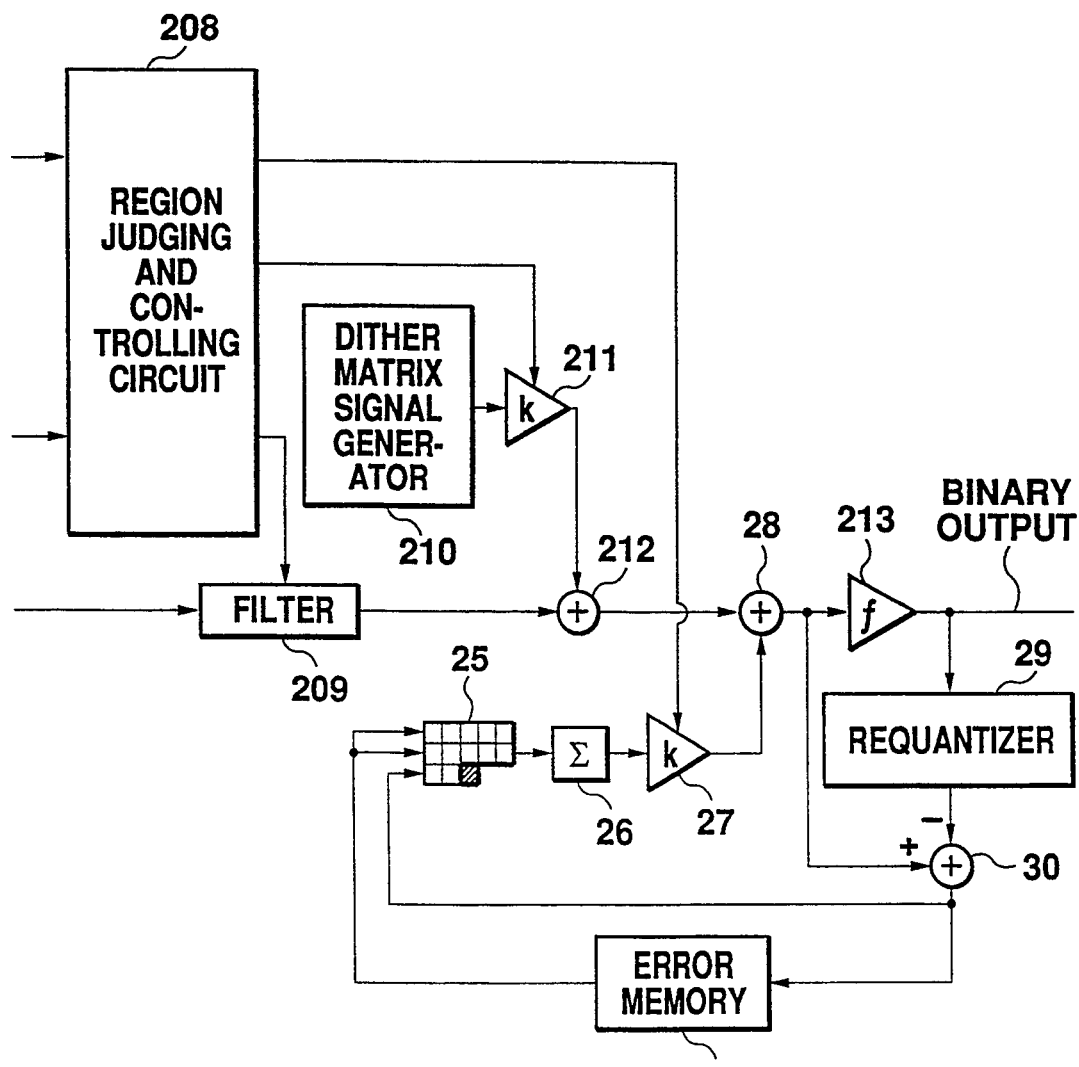
FIG. 7 is a block diagram of a bi-level-quantizing portion in still another embodiment of an image processing apparatus according to the present invention.
Figure 8:
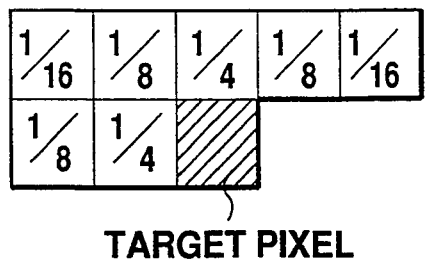
FIG. 8 is an explanatory view of of a coefficient of error weighting addition in the embodiment shown in FIG. 7, which presents a direction of scanning, and a target pixel shown cross-hatched.

FIG. 7 shows a bi-level-quantizing portion in still another embodiment of an image processing apparatus according to the present invention. The elements which are the same as those shown in FIG. 1 are indicated by the same numerals prefixed by the numeral 2, and explanation thereof will be omitted. In FIG. 7, the reference numeral 25 denotes a register for storing a later-described quantizing error with respect to a neighboring pixel, 26 a weighting adder for weighting the quantizing error signal by a predetermined coefficient shown in FIG. 8, 27 a multiplier for multiplying the addition signal by a predetermined coefficient of 0 to 1 in accordance with the control signal from a region judging and controlling circuit 208, 28 an adder for adding the output of an adder 212 and the output of the multiplier 27, 29 a re-quantizer for converting the binary output "0" or "1" supplied from a quantizer 213 into a level of "0" or "255", 30 a subtracter for subtracting the output of the re-quantizer 29 from the input of the quantizer 213 so as to generate a quantizing error signal, and 31 an error memory for temporarily storing the quantizing error signal.

This embodiment is provided with a bi-level-quantizing portion having the above-described structure, and adopts an error diffusion method including a process of weighting and adding a dither matrix signal and an error signal. FIG. 9 shows the coefficients of a filter 209, a dither matrix signal multiplier 211 and a weighting error signal multiplier 27. By this control, it is possible to produce a bi-level-quantized image having a good quality.

In these embodiments, a method of detecting a screened-halftone pattern by the pattern matching of an image signal of 3 lines×5 horizontal pixels which is bi-level-quantized on the basis of an average luminance in the screened-halftone pattern detecting circuit 103 (203) is adopted. The same effects are produced by adopting a method of judging a screened-halftone pattern from the number of turning points in the horizontal direction and the vertical direction of a binary signal such as that described in "Distinguishing and Processing Method in Halftone Dot Photograph", by Ibaraki, Kobayashi and Ochi, *The Journal of The Institute of Electronics, Information and Communication Engineers* (1987), Vol. J70-B, No. 2, pp. 222 to 232.

Although the same neighboring pixels are used to detect a screened-halftone and a continuous-tone in these embodiments, different neighboring pixels may be used.

In addition, although a pattern is detected for each pixel in series in these embodiments, an image signal may be divided into several blocks each consisting of N (e.g., 5) pixels and a pattern may be detected in each block in order to reduce the number of processings. The result of detection is adapted to N pixels of the target line. This processing is called a serial line and pixel block processing.

It is also possible to divide an image signal into several blocks each consisting of N lines and N pixels, thereby enabling block processing in both vertical and horizontal directions.

All processings are realized in a hardware in these embodiments, but they may be executed in a software by using a CPU.

As described above, according to the present invention, two detecting circuits for detecting a screened-halftone pattern and a continuous-tone region pattern by using a neighboring pixel signal of the target pixel, and two counters for counting UP/DOWN in accordance with the outputs of the detecting circuits are provided, and the filtering coefficient such as a smoothing coefficient and a coefficient of high resolution frequency component intensification and the bi-level-quantizing method are switched in multiple stages in accordance with the outputs of the counters. It is thus possible to realize an image processing apparatus which produces an image having a good quality free from deterioration due to the rapid switching of bi-level-quantizing methods.

While there has been described what are at present considered to be a preferred embodiments of the invention, it will be understood that various modifications may be made thereto, and it is intended that the appended claims cover all such modifications as fall within the true spirit and scope of the invention.

What is claimed is:

1. An image processing apparatus for inputting a multi-level image signal including a succession of pixels obtained by electrically scanning an image which contains letters, figures, photographs and screened-halftone in the form of a mixture and outputting the multi-level image signal, the image processing apparatus comprising:

A) a screened-halftone pattern detecting circuit for detecting the screened-halftone pattern by using an image signal which represents a first vicinity of the image which contains a target pixel in the succession of pixels;

B) a screened-halftone smoothing circuit responsive to the screened-halftone pattern detection state on each pixel in the succession of pixels;

C) a continuous-tone pattern detecting circuit for judging whether or not the target pixel is in the continuous-tone region by using an image signal which represents a second vicinity of the image which contains the target pixel;

D) a continuous-tone smoothing circuit responsive to the continuous-tone pattern detection state on each pixel in the succession of pixels; and E) a filter for filtering the image signal of the target pixel on the basis of characteristics in accordance with either or both of the outputs of the two smoothing circuits.

2. The apparatus of claim 1 further including a bi-level-quantizing circuit responsive to the output of the filter.

3. An image processing apparatus according to claim 2, wherein the bi-level-quantizing circuit includes a means for bi-level-quantizing the output with a fixed threshold and a means for bi-level-quantizing the output by using an ordered dither threshold matrix.

4. An image processing apparatus according to claim 2, wherein the bi-level-quantizing circuit includes a means for bi-level-quantizing the output by using an error diffusion method.

5. An image processing apparatus according to any of claims 1 to 3, wherein at least one of the circuits includes a region judging memory for temporarily storing the pattern detection state so that the smoothing circuit smoothes on the basis of the output of the region judging memory.

6. An image processing apparatus according to claim 1, wherein the screened-halftone pattern detecting circuit includes:

a maximum luminance detector for obtaining the maximum luminance in a decision pixel block;

a minimum luminance detector for obtaining the minimum luminance in the decision pixel block;

an average luminance detector for obtaining the average luminance in the decision pixel block;

a subtracter for obtaining the difference between the maximum luminance and the minimum luminance;

a comparator for comparing the luminance of each pixel with the average luminance;

a comparison result register for temporarily storing the output of the comparator; and a screened-halftone pattern detector for detecting a screened-halftone pattern from the output of the subtracter and the output of the comparison result register.

7. An image processing apparatus according to claim 1, wherein the continuous-tone pattern detecting circuit includes:

a maximum luminance detector for obtaining the maximum luminance in a decision pixel block;

a minimum luminance detector for obtaining the minimum luminance in the decision pixel block;

a subtracter for obtaining the difference between the maximum luminance and the minimum luminance; and a continuous-tone pattern detector for detecting a continuous-tone pattern on the basis of the outputs of the maximum luminance detector, the minimum luminance detector and the subtracter.

8. An image processing apparatus according to claim 1, wherein the screened-halftone pattern detecting circuit and the continuous-tone pattern detecting circuit include in common a maximum luminance detector for obtaining the maximum luminance in a decision pixel block, a minimum luminance detector for obtaining the minimum luminance in the decision pixel block and a subtracter for obtaining the difference between the maximum luminance and the minimum luminance.

9. An image processing apparatus according to claim 2, wherein the bi-level-quantizing means includes;
- a register for storing a quantizing error with respect to a neighboring pixel;
- a weighting adder adding a predetermined weighting to a quantizing error;
- a multiplier for multiplying an addition signal by a predetermined coefficient of 0 to 1 in accordance with the control signal from a region judging an controlling circuit;
- an adder for adding the output of the weighting adder and the output of the multiplier;
- a quantizer for quantizing the output of the adder;
- a re-quantizer for converting the output of the quantizer into a different level;
- a subtracter for subtracting the output of the re-quantizer from the input of the quantizer so as to generate a quantizing error signal; and
- an error memory for temporarily storing the quantizing error signal.

10. The apparatus of claim 1 wherein the smoothing circuits are both counters.

11. An image processing method for processing a multi-level image signal including a succession of pixels obtained by electrically scanning an image which contains letters, figures, photographs and screened-halftone in the form of a mixture and outputting the multi-level image signal, the image processing method comprising:
- detecting the screened-halftone pattern using an image signal which represents a first vicinity of the image which contains a target pixel in the succession of pixels;
- smoothing the results of the step of detecting;
- judging whether or not the target pixel is in the continuous-tone region by using an image signal which represents a second vicinity of the image which contains the target pixel;
- smoothing the results of the step of judging; and
- filtering the image signal of the target pixel gradually on the basis of different characteristics in accordance with either or both of the results of the two steps of smoothing.

12. The method of claim 11 further including the step of bi-level-quantizing the results of the step of filtering.

13. The method of claim 12, wherein the step of bi-level-quantizing includes bi-level-quantizing the results with a fixed threshold and bi-level-quantizing the results using an ordered dither threshold matrix.

14. The method of claim 12 wherein said step of bi-level-quantizing bi-level-quantizes the results by using an error diffusion method.

15. The method of any of claim 11 to 14, wherein the smoothing is performed on the basis of the output of a region judging memory.

16. The method of claim 11, wherein the step of detecting includes:
- obtaining the maximum luminance in a decision pixel block;
- obtaining the average luminance in the decision pixel block;
- obtaining the difference between the maximum luminance and the minimum luminance;
- comparing the luminance of each pixel with the average luminance;
- temporarily storing the results of the step of comprising; and
- detecting a screened-halftone pattern from the result of the step of obtaining the difference and the result of the step of temporarily storing.

17. The method of claim 11, wherein the step of judging includes:
- obtaining the maximum luminance in a decision pixel block;
- obtaining the minimum luminance in the decision pixel block;
- obtaining the difference between the maximum luminance and the minimum luminance; and
- detecting a continuous-tone pattern on the basis of the results of the step of obtaining the maximum and the results of the step of obtaining the minimum an the results of the step of obtaining the difference.

18. An image processing apparatus for inputting a multi-level image signal including a succession of pixels obtained by electrically scanning an image which contains letters, figures, photographs and screened-halftone in the form of a mixture and outputting the multi-level image signal, the image processing apparatus comprising:
- a screened-halftone pattern detecting circuit for detecting the screened-halftone pattern in the multi-level signal;
- a screened-halftone smoothing circuit responsive to the screened-halftone pattern detecting circuit;
- a continuous-tone pattern detecting circuit for detecting the continuous-tone pattern in the multi-level signal;
- a continuous-tone smoothing circuit responsive to the continuous-tone pattern detecting circuit; and
- a filter for filtering the image signal on the basis of characteristics in accordance with either or both of the outputs of the two smoothing circuits.

19. The apparatus of claim 18 wherein the smoothing circuits are both counters.

20. The apparatus of claim 18 further including a bi-level-quantizing circuit responsive to the output of the filter.

21. An image processing apparatus according to claim 20, wherein the bi-level quantizing circuit includes a means for bi-level-quantizing the output with a fixed threshold and a means for bi-level-quantizing the output by using an ordered dither threshold matrix.

22. An image processing apparatus according to claim 20, wherein the bi-level-quantizing circuit includes a means for bi-level-quantizing the output by using an error diffusion method.

23. An image processing apparatus according to claim 20, wherein the bi-level-quantizing circuit includes;
- a register for storing a quantizing error with respect to a neighboring pixel;
- a weighting adder adding a predetermined weighting to a quantizing error;
- a multiplier for multiplying an addition signal by a predetermined coefficient of 0 to 1 in accordance with the control signal from a region judging an controlling circuit;
- an adder for adding the output of the weighting adder and the output of the multiplier;
- a quantizer for quantizing the output of the adder;
- a re-quantizer for converting the output of the quantizer into a different level;

a subtracter for subtracting the output of the re-quantizer from the input of the quantizer so as to generate a quantizing error signal; and an error memory for temporarily storing the quantizing error signal.

24. An image processing apparatus according to any of claims 18 to 23, wherein at least one of the smoothing circuits includes a region judging memory for temporarily storing the pattern detection state so that the smoothing circuit smoothes on the basis of the output of the region judging memory.

25. An image processing apparatus according to claim 18, wherein the screened-halftone pattern detecting circuit includes:

a maximum luminance detector for obtaining the maximum luminance in a decision pixel block;

a minimum luminance detector for obtaining the minimum luminance in the decision pixel block;

an average luminance detector for obtaining the average luminance in the decision pixel block;

a subtracter for obtaining the difference between the maximum luminance and the minimum luminance;

a comparator for comparing the luminance of each pixel with the average luminance;

a comparison result register for temporarily storing the output of the comparator; and a screened-halftone pattern detector for detecting a screened-halftone pattern from the output of the subtracter and the output of the comparison result register.

26. An image processing apparatus according to claim 18, wherein the continuous-tone pattern detecting circuit includes:

a maximum luminance detector for obtaining the maximum luminance in a decision pixel block;

a minimum luminance detector for obtaining the minimum luminance in the decision pixel block;

an average luminance detector for obtaining the average luminance in the decision pixel block;

a subtracter for obtaining the difference between the maximum luminance and the minimum luminance; and a continuous-tone pattern detector for detecting a continuous-tone pattern on the basis of the outputs of the maximum luminance detector, the minimum luminance detector and the subtracter.

27. An image processing apparatus according to claim 18, wherein the screened-halftone pattern detecting circuit and the continuous-tone pattern detecting circuit include in common a maximum luminance detector for obtaining the maximum luminance in a decision pixel block, a minimum luminance detector for obtaining the minimum luminance in the decision pixel block and a subtracter for obtaining the difference between the maximum luminance and the minimum luminance.

28. An image processing method for processing a multi-level image signal including a succession of pixels obtained by electrically scanning an image which contains letters, figures, photographs and screened-halftone in the form of a mixture and outputting the multi-level image signal, the image processing method comprising:

generating a first signal indicating a likelihood that the multi-level image signal represents a screened-halftone region, generating a second signal indicating a likelihood that the multi-level image signal represents a continuous-tone region, processing the multi-level image signal using a plurality of methods simultaneously, adjusting a first of the methods in accordance with the first and second signals generated in each of the steps of generating, and adjusting a second of the methods in accordance with the first and second signals generated in each of the steps of generating.

29. The method of claim 28 wherein the step of processing uses filtering as the first method and wherein the step of adjusting a first of the methods adjusts the characteristics of the filtering.

30. The method of claim 28 wherein the step of processing uses dithering as the first method and wherein the step of adjusting a first of the methods adjusts the amplitude of the dithering.

31. The method of claim 30 wherein the step of processing uses filtering as the second method and wherein the step of adjusting a second of the methods adjusts the characteristics of the filtering.

32. The method of claim 28 further including the step of bi-level-quantizing the results of the step of filtering.

33. The method of claim 32, wherein the step of bi-level-quantizing includes bi-level-quantizing the results with a fixed threshold and bi-level-quantizing the results using an ordered dither threshold matrix.

34. The method of claim 32 wherein said step of bi-level-quantizing bi-level-quantizes the results by using an error diffusion method.

35. The method of any of claim 28 to 34, wherein the smoothing is performed on the basis of the output of a region judging memory.

36. The method of claim 28, wherein the step of detecting includes:

obtaining the maximum luminance in a decision pixel block;

obtaining the average luminance in the decision pixel block;

obtaining the difference between the maximum luminance and the minimum luminance;

comparing the luminance of each pixel with the average luminance;

temporarily storing the results of the step of comparing; and detecting a screened-halftone pattern from the result of the step of obtaining the difference and the result of the step of temporarily storing.

37. The method of claim 28, wherein the step of judging includes:

obtaining the maximum luminance in a decision pixel block;

obtaining the minimum luminance in the decision pixel block;

obtaining the difference between the maximum luminance and the minimum luminance; and detecting a continuous-tone pattern on the basis of the results of the step of obtaining the maximum and the results of the step of obtaining the minimum and the results of the step of obtaining the difference.

38. An image processing apparatus for inputting a multi-level image signal including a succession of pixels obtained by electrically scanning an image which contains letters, figures, photographs and screened-halftone in the form of a mixture and outputting the multi-level image signal, the image processing apparatus comprising:

screened-halftone pattern detecting means for detecting the screened-halftone pattern by using an image signal which represents a first vicinity of the image which contains a target pixel in the succession of pixels;

screened-halftone smoothing means for smoothing the screened-halftone pattern detection state on each pixel in the succession of pixels;

continuous-tone pattern detecting means for judging whether or not the target pixel is in the continuous-tone region by using an image signal which represents a second vicinity of the image which contains the target pixel;

continuous-tone smoothing means for smoothing the continuous-tone pattern detection state on each pixel in the succession of pixels; and filtering means for filtering the image signal of the target pixel on the basis of characteristics in accordance with either or both of the outputs of the two smoothing means.

39. The apparatus of claim 38 wherein the smoothing means are both counting means.

40. The apparatus of claim 38 further including bi-level-quantizing means responsive to the filtering means.

41. An image processing apparatus according to claim 40, wherein the bi-level-quantizing means includes a means for bi-level-quantizing the output with a fixed threshold and a means for bi-level-quantizing the output by using an ordered dither threshold matrix.

42. An image processing apparatus according to claim 40, wherein the bi-level-quantizing means includes a means for bi-level-quantizing the output by using an error diffusion method.

43. An image processing apparatus according to claim 40, wherein the bi-level-quantizing means includes;

a register for storing a quantizing error with respect to a neighboring pixel;

a weighting adder adding a predetermined weighting to a quantizing error;

a multiplier for multiplying an addition signal by a predetermined coefficient of 0 to 1 in accordance with the control signal from a region judging an controlling circuit;

an adder for adding the output of the weighting adder and the output of the multiplier;

a quantizer for quantizing the output of the adder;

a re-quantizer for converting the output of the quantizer into a different level;

a subtracter for subtracting the output of the re-quantizer from the input of the quantizer so as to generate a quantizing error signal; and an error memory for temporarily storing the quantizing error signal.

44. An image processing apparatus according to any of claims 38 to 43, wherein at least one of the smoothing means includes a region judging memory means for temporarily storing the pattern detection state so that the smoothing means smoothes on the basis of the output of the region judging memory means.

45. An image processing apparatus according to claim 38, wherein the screened-halftone pattern detecting means includes:

a maximum luminance detector for obtaining the maximum luminance in a decision pixel block;

a minimum luminance detector for obtaining the minimum luminance in the decision pixel block;

an average luminance detector for obtaining the average luminance in the decision pixel block;

a subtracter for obtaining the difference between the maximum luminance and the minimum luminance;

a comparator for comparing the luminance of each pixel with the average luminance;

a comparison result register for temporarily storing the output of the comparator; and a screened-halftone pattern detector for detecting a screened-halftone pattern from the output of the subtracter and the output of the comparison result register.

46. An image processing apparatus according to claim 38, wherein the continuous-tone pattern detecting means includes:

a maximum luminance detector for obtaining the maximum luminance in a decision pixel block;

a minimum luminance detector for obtaining the minimum luminance in the decision pixel block;

an average luminance detector for obtaining the average luminance in the decision pixel block;

a subtracter for obtaining the difference between the maximum luminance and the minimum luminance; and a continuous-tone pattern detector for detecting a continuous-tone pattern on the basis of the outputs of the maximum luminance detector, the minimum luminance detector and the subtracter.

47. An image processing apparatus according to claim 38, wherein the screened-halftone pattern detecting means and the continuous-tone pattern detecting means include in common a maximum luminance detector for obtaining the maximum luminance in a decision pixel block, a minimum luminance detector for obtaining the minimum luminance in the decision pixel block and a subtracter for obtaining the difference between the maximum luminance and the minimum luminance.

* * * * *